United States Patent [19]

Benjaram et al.

[11] Patent Number: 5,131,015
[45] Date of Patent: Jul. 14, 1992

[54] COMBINED BAUD RATE GENERATOR AND DIGITAL PHASE LOCKED LOOP

[75] Inventors: Bhoopal R. Benjaram, Sunnyvale; Anthony J. P. O'Toole, San Jose, both of Calif.

[73] Assignee: Cirrus Logic, Inc., Fremont, Calif.

[21] Appl. No.: 601,855

[22] Filed: Oct. 22, 1990

[51] Int. Cl.⁵ .............................................. H04L 23/00
[52] U.S. Cl. ..................................... 375/121; 328/155
[58] Field of Search ................. 375/120, 121, 99, 110; 328/109, 110, 155; 331/14, 1 R, 1 A, DIG. 2; 324/166, 172; 370/93, 105.3

[56] References Cited

U.S. PATENT DOCUMENTS

| | | | |
|---|---|---|---|
| 4,061,978 | 12/1977 | Motley et al. | 375/99 X |
| 4,573,172 | 2/1986 | Grimaldi | 375/116 |
| 4,586,189 | 4/1986 | Tyrrell | 370/48 X |
| 4,694,504 | 9/1987 | Porter et al. | 375/110 X |
| 4,823,312 | 4/1989 | Michael et al. | 364/900 |
| 4,825,437 | 4/1989 | Balech | 375/120 X |
| 4,837,781 | 6/1989 | Hickling | 375/81 |
| 4,847,876 | 7/1989 | Baumbach et al. | 375/120 |
| 4,853,943 | 8/1989 | Laws | 375/81 X |

Primary Examiner—Benedict V. Safourek
Assistant Examiner—Tesfaldet Bocure
Attorney, Agent, or Firm—Skjerven, Morrill, MacPherson, Franklin & Friel

[57] ABSTRACT

A combined BAUD rate generator and digital phase locked loop (DPLL) circuit operates in either an asynchronous BAUD rate generating mode or a synchronous phase-locked mode. The combination circuit requires less circuitry than a functionally equivalent circuit with a separate BAUD rate generator and DPLL. The combination circuit comprises a count register, a period register, a decrementing/incrementing circuit, a phase adjusting circuit, and a clock option register. In a first operating mode, the combination circuit functions as a programmable BAUD rate generator which may be used for asynchronous communication applications. In a second operating mode, the combination circuit functions as both a programmable BAUD rate generator and a digital phase locked loop that may be used for synchronous communication applications and that includes an improved method for phase locking a sampling signal to an input signal. The combination circuit utilizes the same period register, count register, clock option register, and other common circuitry, during both the BAUD rate generating mode and the phase locked mode.

8 Claims, 9 Drawing Sheets

COMBINED BAUD RATE GENERATOR AND DIGITAL PHASE LOCKED LOOP

BACKGROUND OF THE INVENTION

1. Field of the Invention

The invention relates to synchronous/asynchronous communications controllers. Furthermore, the invention relates to phase locked loop circuits.

2. Description of the Relevant Art

BAUD rate generators and phase locked loop circuits each have many applications. In certain of these applications, such as communications apparatus for computer systems, both a BAUD rate generator and a phase locked loop are required. A UASRT (Universal Asynchronous Synchronous Receiver Transmitter) is one such device which typically requires both a BAUD rate generator and a phase locked loop. A designer of a UASRT circuit thus incorporates a BAUD rate generator and a phase locked loop within the UASRT and treats them as separate units.

Communication controllers allow modern computers to accept data or instructions originating from a plurality of remote terminals or from other computers. The term "communications controller" is used for a variety of communications peripherals, including UASRTs, which control the transmission and reception of data and typically perform a number of additional tasks.

Almost all computer systems are logically organized to transmit data between the central processing unit (CPU), memory, and peripheral devices in words or characters consisting of a plurality of bits in parallel. Remote terminals which are to communicate with the computer system, on the other hand, must use serial transmission since only this type of transmission channel is available from common carriers such as modems. Virtually all computer communications are, therefore, standardized with the serial transmission of data.

Additional bits and characters may be incorporated into the serial data stream for synchronization and control purposes. The data, in addition to these inserted control bits and characters, is oriented in a serial bit string at a transmitting port. The serial bit string is received at a receiving port where it is reconverted to form the original data characters with the support of the inserted control bits and characters. This process is transparent to the end user for whom the serial link is a mechanism for transmitting parallel data.

The interconnection of computers and terminals over serial communication mechanisms therefore requires several basic functions including the following: conversion of data from parallel form to serial form at the transmitting end, the conversion of data from serial form to parallel form at the receiving end, the insertion of control bits and characters for data synchronization and error control on the transmitting end, and the interpretation of these control bits and characters on the receiving end.

As the size and complexity of data communication networks have increased, more sophisticated units have been developed which perform a number of additional tasks. Examples of such additional tasks include: 1) line polling; 2) auto-BAUD (automatic speed) detection; 3) ability to handle many different line protocols; 4) code conversion (e.g., ASCII to EBCDIC or vice versa); 5) message assembly and simple editing; 6) error correction; 7) data compression; 8) simple syntax checking; 9) automatic loading and restart of remote computers and terminals; 10) data buffering, multiplexing, and concentrating; 11) automatic gathering of network statistics, including error logging; and 12) network diagnostics.

Many newer communications controllers are user programmable. Such controllers help to reduce the overhead by handling many of the tasks which were formerly handled by the host computer. These controllers are often more flexible than older controllers in that they can be programmed to perform new functions or support new types of terminals. Moreover, in many cases, programming of such units is much simpler than embedding the same functions into a complex operating system on the host.

To accommodate widespread use, manufacturers design communications controllers to be easily interfaced with a large variety of terminals and data types. Different terminals and data types often have varying data rates, may be buffered or unbuffered, local or remote, and operate in synchronous or asynchronous modes. To accommodate each of these variants, the input/output structure of a controller should be very flexible. For high speed lines, special channels with direct memory access (DMA) are desirable. Such channels can access memory on a cycle stealing basis and require no interventions by the processor once the transfer is initiated.

A communications controller that operates in an asynchronous mode typically includes a programmable BAUD rate generator to convert an incoming data stream to parallel data. In asynchronous mode, start bits are used to signal the start of a character. The phase of the sampling clock that is used to select when the received data stream is sampled by the input circuitry is determined by the initial edge of the start bit which precedes each character transmitted and which can occur at any time. The BAUD rate generator produces a BAUD rate signal which is used to determine the rate at which an incoming signal is sampled. Sampling circuitry accordingly samples the incoming signal at the rate of the BAUD rate signal and in accordance with the phase of the start bits. The sampling circuitry finally converts the received data stream to parallel data.

A communications controller that operates in a synchronous mode typically includes a digital phase locked loop (DPLL) circuit that contains a programmable BAUD rate generator to convert the received data stream to parallel data. In synchronous mode, the DPLL provides a sampling clock to the sampling circuitry that is phase-locked with the received data stream. This allows the input circuitry to place the character bits in their proper positions in the bit stream without the requirement of start and stop bits.

FIG. 1 shows a block diagram of a portion of a UASRT circuit wherein a BAUD rate generator and a digital phase locked loop (DPLL) are incorporated as separate units. A multiplexer 14 selects either an external clock or the system clock to go to multiplexer 11. Multiplexer 11 selectively couples a clock signal or a divided clock signal to the BAUD rate generator 10 and the digital phase locked loop 12. The output lines of BAUD rate generator 10 and DPLL 12 are connected to a sampling circuit 13. Sampling circuit 13 is programmed to select the BAUD rate generator clock signal or the DPLL clock signal to sample the received data stream.

When the UASRT shown in FIG. 1 operates in an asynchronous mode, BAUD rate generator 10 is programmed to generate a BAUD rate clock signal indicative of the divided or undivided clock signal coupled through multiplexers 11 and 14. Sampling circuit 13 is programmed to select this BAUD rate clock signal as the sampling clock and to sample the received data stream. During asynchronous mode, the DPLL clock signal is not used by sampling circuit 13 and may not be generated by DPLL 12.

When the UASRT operates in the synchronous mode, the DPLL 12 provides the sampling clock (DPLL clock signal) to sampling circuit 13. DPLL 12 contains phase adjusting circuitry, which, depending on the edges of the received data stream, makes phase adjustments to produce the DPLL clock signal. During synchronous mode, the BAUD rate generator clock signal is not used by sampling circuit 13 and may not be generated by BAUD rate generator 10.

In order to generate a sampling clock signal having a certain BAUD rate and phase, a digital phase locked loop such as DPLL 12 commonly utilizes a count register which contains values incremented or decremented from a start value to a stop value. When the value in the count register reaches the stop value, the count register is reset to its start value and the sequence repeats. This counting sequence determines the BAUD rate. Phase adjustments are accomplished by adjusting the value in the count register an amount based on the difference between the time at which transitions of an incoming signal occur, and the time at which the DPLL repeats the sequence to generate another cycle of the sampling clock signal.

It has been an on-going developmental objective within the electronics industry to minimize the overall size of and number of components required in a circuit to perform a particular task. Accordingly, a BAUD rate generator circuit and a digital phase locked loop circuit are desirable that may be used in applications such as computer communications and that require a minimal overall size and number of components.

SUMMARY OF THE INVENTION

In accordance with the invention, a combined BAUD rate generator and digital phase locked loop circuit is provided that is capable of operating in either a BAUD rate generating mode or a combined BAUD rate generating/phase-locked mode. The combination circuit requires minimal circuitry.

In a first operating mode, the combination circuit functions as a programmable BAUD rate generator which may be used for asynchronous communication applications. In a second operating mode, the combination circuit functions as a combined BAUD rate generator and digital phase locked loop which may be used for synchronous communication applications and which includes an improved method for phase locking a sampling signal to received data stream signal.

In one embodiment, the combination circuit comprises a count register, a period register, a clock option register, a count incrementor/decrementor, and a phase adjusting circuit. The combination circuit utilizes the same period register, count register, clock option register, and other common circuitry during both the BAUD rate generating mode and the phase locked mode. The method for phase locking and generating a BAUD rate signal includes an up/down counting scheme which allows for a reduction in the amount of circuitry required.

In one application of the invention, a communications controller integrated circuit includes the combination circuit to provide four independent, full-duplex channels programmable in either asynchronous or synchronous mode. Since the synchronous and asynchronous operating modes of the communications controller are mutually exclusive, the combined BAUD rate generator/DPLL according to the invention is incorporated as a single unit to reduce the overall circuitry requirements of the communications controller.

These and other advantages are achieved in the present invention, in accordance with which a combined BAUD rate generator and phase locked loop circuit comprises a single BAUD rate generator for generating a sampling signal having a selected BAUD rate. Phase adjusting means is connected to the BAUD rate generator for increasing or decreasing the BAUD rate of the BAUD rate generator as a function of the phase difference between the sampling signal and a received data stream. The phase adjusting means controls the phase of the sampling signal during a synchronous mode and does not control the phase of the sampling signal during the asynchronous mode.

In accordance with another aspect of the invention, a digital phase locked loop circuit is provided for adjusting the phase of a sampling clock signal depending upon the phase of a received data stream. The digital phase locked loop comprises a counting means that increments and decrements a count value during a single cycle of the sampling clock. A phase adjusting circuit is connected to the counting means for changing the count value depending upon the count value at a time when a transition of the incoming signal occurs.

The invention will be more readily understood by reference to the drawings and the detailed description. As will be appreciated by one skilled in the art, the invention is applicable to combined BAUD rate generating/DPLL circuitry in general and to digital phase locked loop circuitry in general, and is not limited to the specific embodiment disclosed.

DETAILED DESCRIPTION OF THE INVENTION

Figure 1:
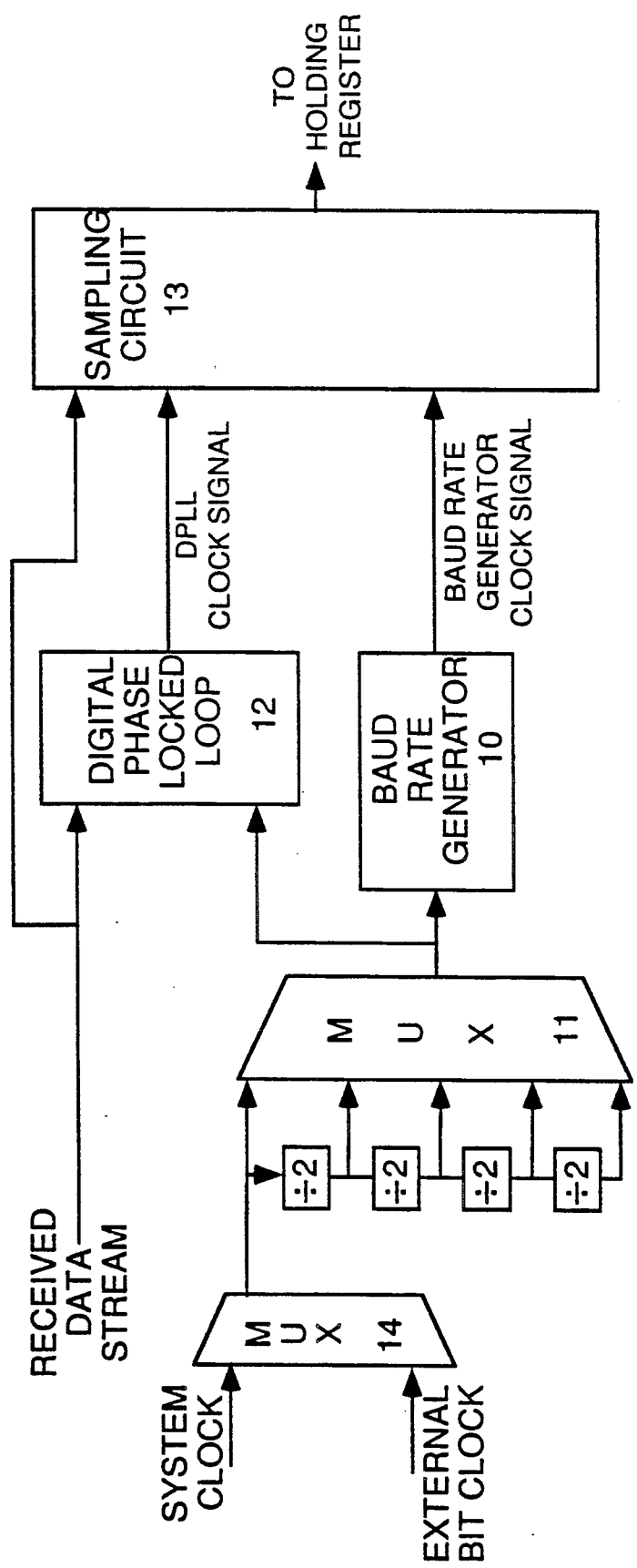
FIG. 1 (Prior Art) shows a block diagram of a portion of a UASRT circuit wherein a BAUD rate generator and a digital phase locked loop are incorporated as separate units.
Figure 2:
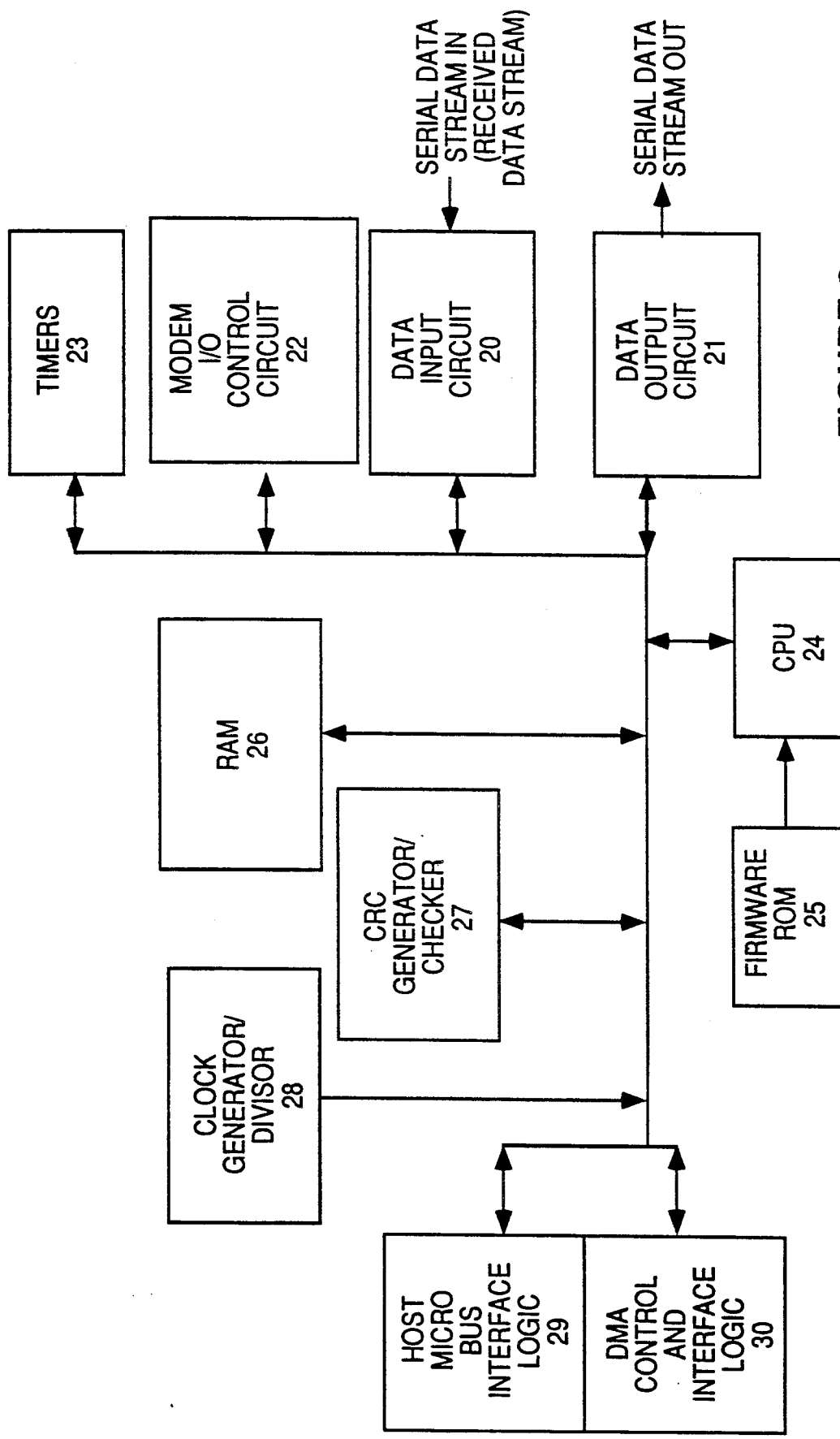
FIG. 2 shows a block diagram of a communications controller which incorporates a combined BAUD rate generator and DPLL.

Referring to FIG. 2, a block diagram of a synchronous/asynchronous communications controller with which the present invention is adapted is shown. The communications controller provides four independent, full-duplex channels which are programmable in asynchronous or synchronous protocol. Full on-chip support for DMA (direct memory access) is provided for each channel in each direction.

The communications controller includes a four channel data input circuit 20, a four channel data output circuit 21, a modem I/O control circuit 22, eight timers 23, a central processing unit 24, and firmware read only memory (ROM) 25. The communications controller further comprises a random access memory (RAM) 26, a CRC generator/checker circuit 27, a clock generator/divisor circuit 28, a host bus interface 29, and a DMA control and interface circuit 30.

When the communications controller operates in the asynchronous mode, each channel can be independently programmed to transmit and receive with five to eight bits per character with optional odd or even parity. Data input circuit 20 has a start-bit validation mechanism that prevents transient spikes from being passed as a start bit. Furthermore, parity, framing, and overrun errors are detected by the circuitry. Data output circuit 21 can be programmed to supply one, one-and-one-half, or two stop bits per character. In the synchronous mode, both bit-oriented and byte-oriented protocols are supported. In addition, both CRC-16 and CCITT error checking polynomials are supported. CRC generator 27 may be preset to all 1's or to all 0's.

The communications controller is programmable to encode and decode serial data using either NRZ, NRZI, or Manchester encoding. For NRZ encoding, a "1" bit is represented by a HIGH level during the entire bit period, and a "0" is represented by a LOW level during the entire bit period. For NRZI encoding, a "1" is represented by no change in level at the beginning of the bit period, and a "0" is represented by a change in level at the beginning of the bit period. For Manchester encoding, transitions that represent a "0" or a "1" bit occur in the middle of the bit period. A HIGH-to-LOW transition represents a "1", and a LOW-to-HIGH transition represents a "0". If two or more consecutive 0's or 1's are sent, additional transitions occur at the beginning of the bit period.

Figure 3:
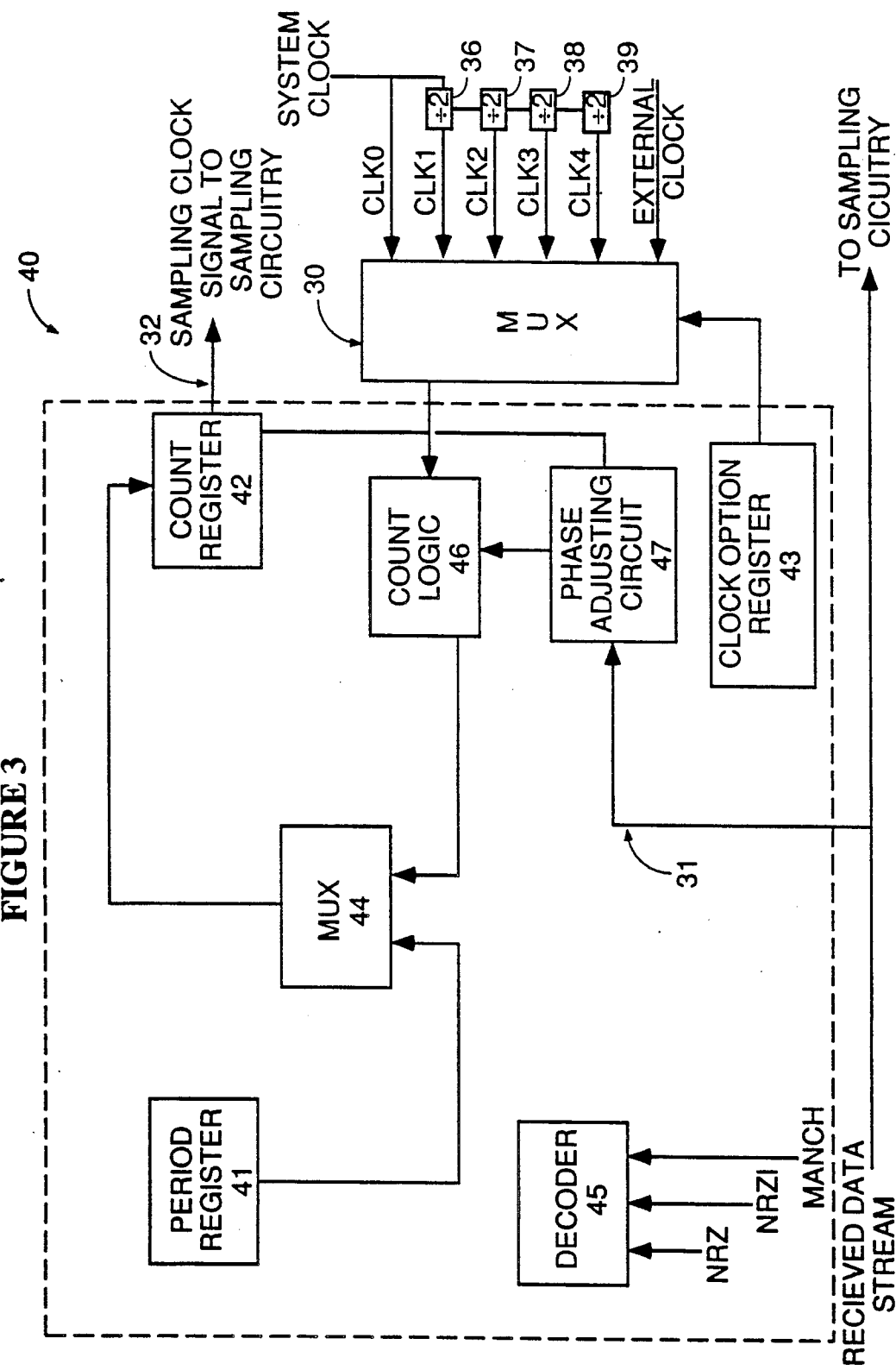
FIG. 3 shows a block diagram of a combined BAUD rate generator and digital phase-locked loop according to the present invention.

FIG. 3 shows a block diagram of a portion of data input circuit 20 within the communications controller. A plurality of divider circuits 36–39 divide the frequency of a system clock signal and provide clock signal inputs to a multiplexer 30. Multiplexer 30 is connected to select and channel a clock input signal (divided, undivided, or external) to a combined BAUD rate generator and digital phase locked loop circuit 40. A data stream is received by the combination circuit 40 at an input line 31. A sampling clock signal having a selected BAUD rate is generated at output line 32. The sampling clock signal is provided to sampling circuitry (not shown) that samples the received bit values from the received data stream and converts a plurality of these bit values to characters.

Combination circuit 40 comprises a period register 41, a count register 42, a clock option register 43, a multiplexer 44, and a decoder 45. Count logic 46 and a phase adjusting circuit 47 are further provided. In this embodiment, period register 41 is an eight-bit register, count register 42 is a seven-bit register, and clock option register 43 is a three-bit register. It should be noted that the size of these registers may be varied without departing from the scope of the invention.

In both synchronous and asynchronous modes, sources external to the communications controller govern the generation of the desired BAUD rate by loading a value from 1 to 255 into period register 41 and a value from 0 to 5 into clock option register 43. Period register 41 determines how many counts occur in count register 42 per each sampling clock period. Clock option register 43 causes one of several clock sources to pass through multiplexer 30 into count logic 46 which thus determines the count rate of count register 42. Multiplexer 30 is controlled by clock option register 43 such that the frequency of the clock source received at count logic 46 is as near as possible to an exact multiple of the frequency of the incoming data.

The sampling clock signal at output line 32 is generated by combination circuit 40 using an up/down counting scheme. It is an object of the present invention to reduce the size of count register 42 and the size of the phase adjusting circuit 47 by using an up/down counting scheme. Count register 42 is initialized with the value contained in period register 41 right shifted by one bit position. When enabled by count logic 46, count register 42 counts down from the initialized value to zero. When the count value reaches zero, count logic 46 causes the counting sequence of the value in count register 42 to reverse in direction, i.e., to increment in value until it is equal to, or one greater than, the value in period register 41. The process of incrementing count register 42 stops when its value equals the value in period register 41 right-shifted by one bit position if the least significant bit of period register 41 is a zero. If the least significant bit of period register 41 is a one, then the incrementing of count register 42 stops when its value equals one more than the value in period register 41 right-shifted by one bit position. The time required to decrement from the initialized value to zero and back up to the stopping value forms one period of the sampling clock at output line 32. Subsequently, this cyclical process (starting with initializing count register 42) repeats to generate the next sampling clock, thus producing the sampling clock at the desired BAUD rate. This BAUD rate generation function occurs when the communications controller operates in either synchronous or asynchronous mode.

When the communications controller operates in synchronous mode, combination circuit 40 functions both as a BAUD rate generator and as a digital phase-locked loop. The DPLL locks in phase with the received data stream through adjustments made to the value in count register 42 which cause phase adjustments in the resulting sampling clock at output line 32. Phase adjusting circuit 47 monitors the transitions of the incoming data and causes count logic 46 to adjust the value in count register 42 a certain amount. The amount of adjustment made is determined by the value in count register 42 at the time when the incoming data edge is detected by phase adjusting circuit 47.

In synchronous mode, combination circuit 40 operates as a DPLL for NRZ, NRZI, and Manchester encoding of the received data stream. The operation in the DPLL mode is described below for Manchester encoding. With Manchester encoding, transitions in the received data stream occur only a the center of a bit cell.

Figure 4:
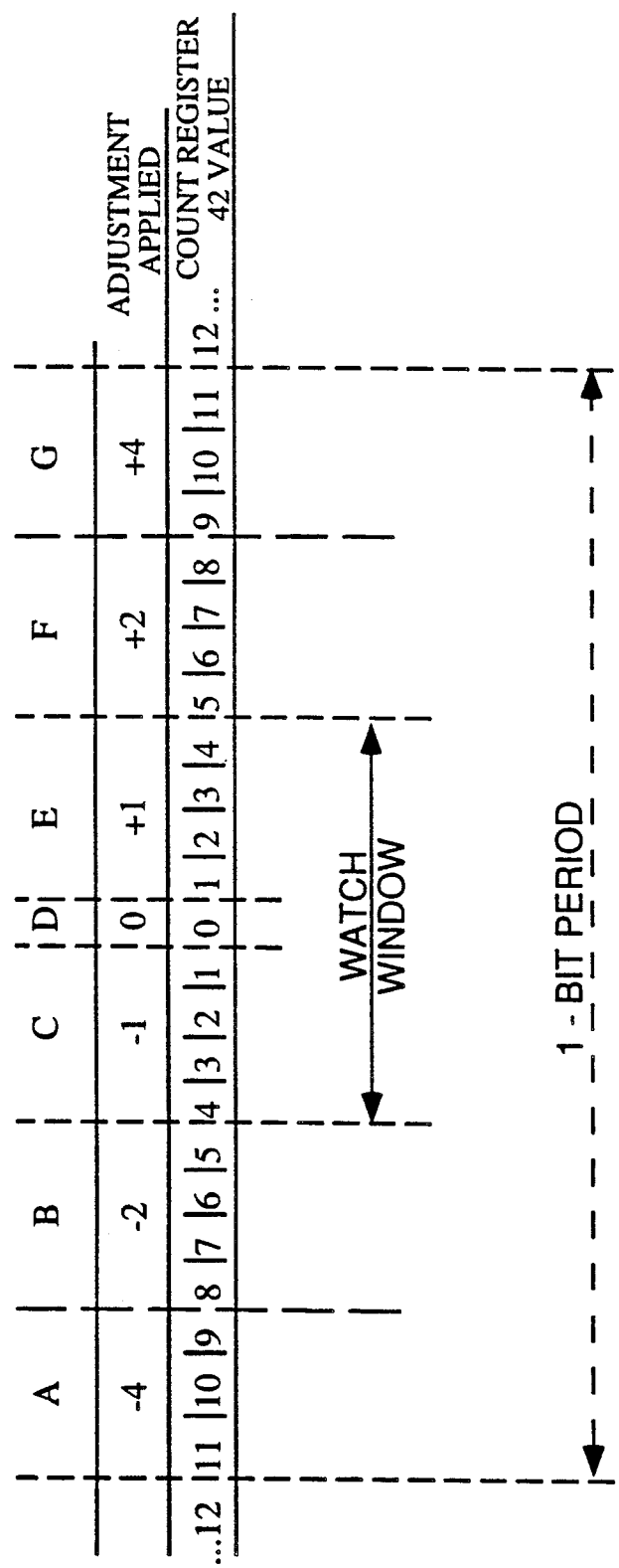
FIG. 4 illustrates seven regions of a bit cell with respect to the counting process.

A data bit period is divided into seven regions. FIG. 4 illustrates these regions (columns A–G) with respect to the counting and phase adjusting process. For this example, the value in count register 42 is programmed to decrement from a value of 11 to 0 and to subsequently increment back to 11. The adjustment made to count register 42 for each region is shown. For columns A–C, the value in count register 42 is decrementing. For columns E-G, the value in count register 42 is incrementing.

No adjustment is made to count register 42 if the data transition is detected when the value in count register 42 equals zero, which indicates that the DPLL is perfectly synchronized to the received data stream. This adjustment is shown in column D, wherein the adjustment applied to count register 42 is zero if the value in count register 42 is also zero (when the data transition occurs).

Phase adjusting circuit 47 makes adjustments to the value in count register 42 so as to center the data transition in the middle of the regions centered around count=0 called the watch window. In the worst case, the received data stream is initially locked within the watch window in two character times. When a serial stream first starts, there is one transition per data bit, and adjustments are applied to the value in count register 42 to cause the data transitions to occur within the watch window. When this is achieved, phase adjusting circuit 47 sets a flag referred to as INSYNC to indicate that the sampling clock is synchronized to the received data stream. The decoder circuit 45 is selected for Manchester encoding such that a HIGH-to-LOW transition detected within the watch window indicates a logic "1", while a LOW-to-HIGH transition detected within the watch window indicates a logic "0". During data reception (i.e., after initially synchronized), the DPLL makes minor phase adjustments whenever necessary to maintain synchronization.

As an example of the phase adjusting process, if a data transition occurs when the value in count register 42 is seven and while count register 42 is decrementing, referring to FIG. 4, a value of 2 is effectively subtracted from the value in count register 42 (column B). If a data transition occurs when the value in count register 42 is nine and while count register 42 is incrementing, a value of 4 is effectively subtracted from the value in count register 42. The value in count register 42 is therefore adjusted such that its value is nearer or within the center of the watch window when a data transition is detected.

The data decoding scheme varies slightly when NRZI framing is used. The same method for adjusting the value in count register 42 explained above is implemented although the INSYNC flag is not used. A data transition occurring within the watch window indicates a logic "0", while no data transition indicates a logic "1".

For NRZ encoding, the signal level represents the data type, and thus the data decoding scheme samples the incoming data stream at the end of each clock cycle. If the incoming data is High at that time, a logic "1" is indicated. If the incoming data is Low, a logic "0" is indicated.

The up/down counting algorithm allows the combination circuit to make finer adjustments for a smaller size count register 42; for example, as accurate as 1-in-128 for a seven-bit count register 42. In addition, since the value in count register 42 decrements and increments to define a single bit time, count register 42 requires one less bit compared to the count registers utilized in conventional digital phase locked loop circuits having the same accuracy.

The counting scheme of counting down until the count is equal to 0 and counting up until the count is equal to or one greater than the value in period register 41 is preferred to counting down twice or counting up twice since less logic is required to identify the windows that determine the amount of correction to apply to the count value. Thus it is inherently faster because of the reduced logic. That is, since during a single bit period, count register 42 decrements to zero and increments back up, the absolute value of count register 42 at the time a transition occurs is proportional to the amount of adjustment to be made to count register 42. As the count value in count register 42 decreases, the amount of correction applied to count register 42 also decreases. This characteristic makes it possible to design a less complex count logic and phase adjusting circuit for adjusting the count value.

Figure 5:
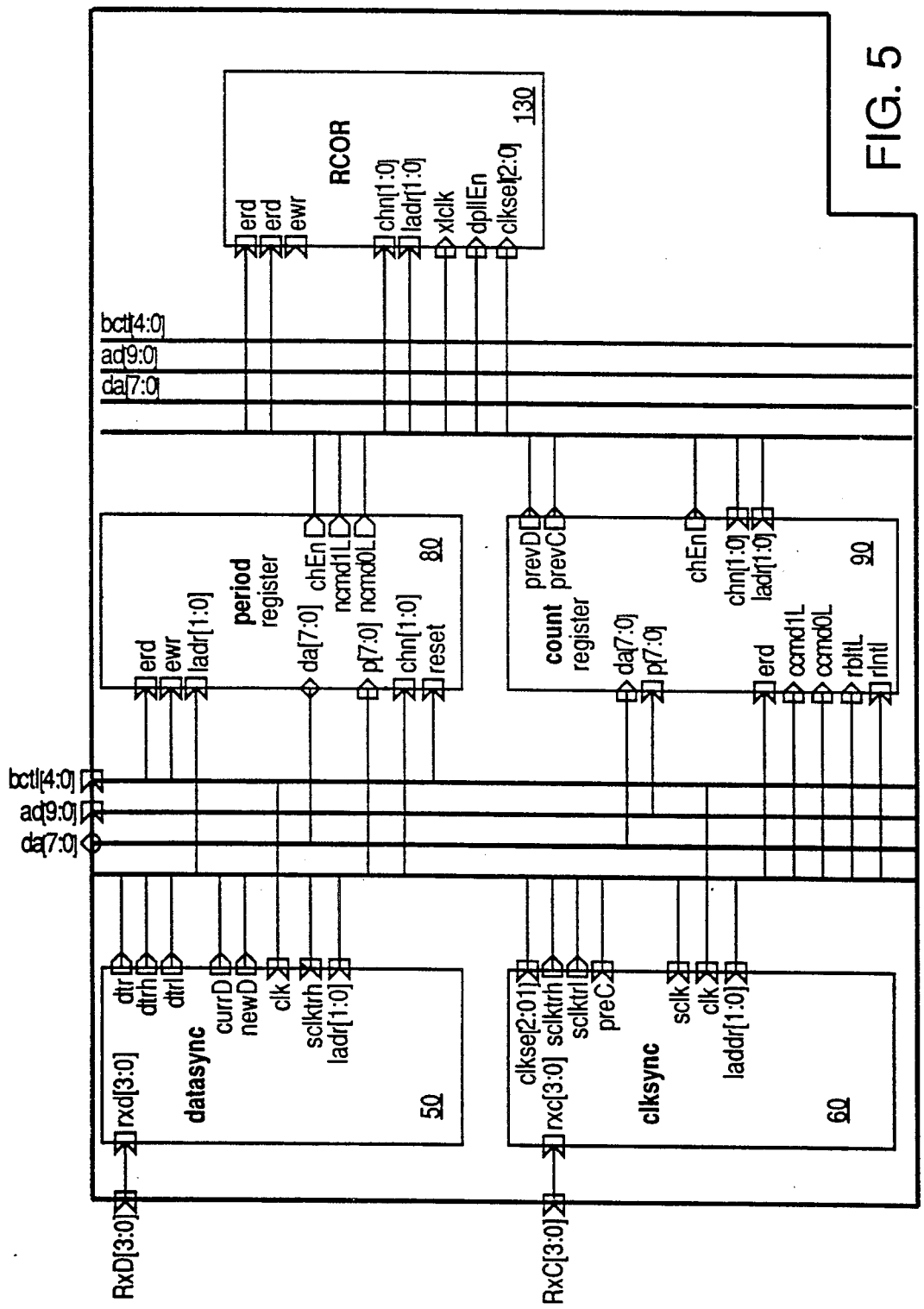
FIG. 5 shows a block diagram of a data input circuit for a communications controller in accordance with one embodiment of the invention.

FIGS. 5-9 show a schematics of a specific embodiment of combination circuit 40 in more detail. Referring to FIG. 5, combination circuit 40 includes blocks labelled datasync 50, clksync 60, period register 80, count register 90, and clock option register (RCOR) 130.

Figure 6:
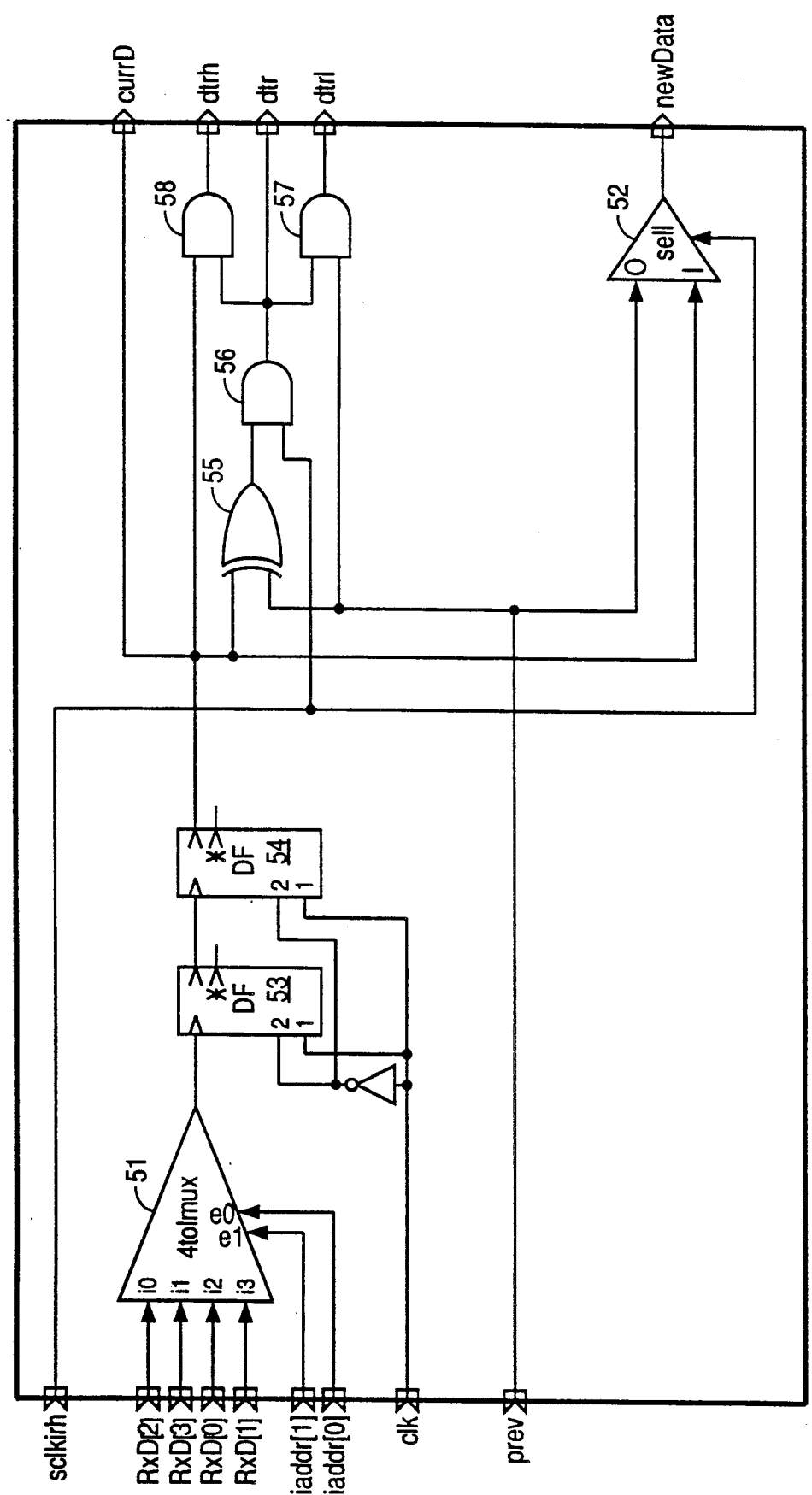
FIGS. 6-9 show schematics of each block within the data input circuit in accordance with one embodiment of the invention.

A schematic of datasync block 50 is shown in FIG. 6. Datasync block 50 includes multiplexers 51 and 52, flip-flops 53 and 54, exclusive OR gate 55, and AND gates 56-58. Datasync block 50 functions to eliminate metastability and to detect data edges and level changes in the input data stream.

Figure 7:
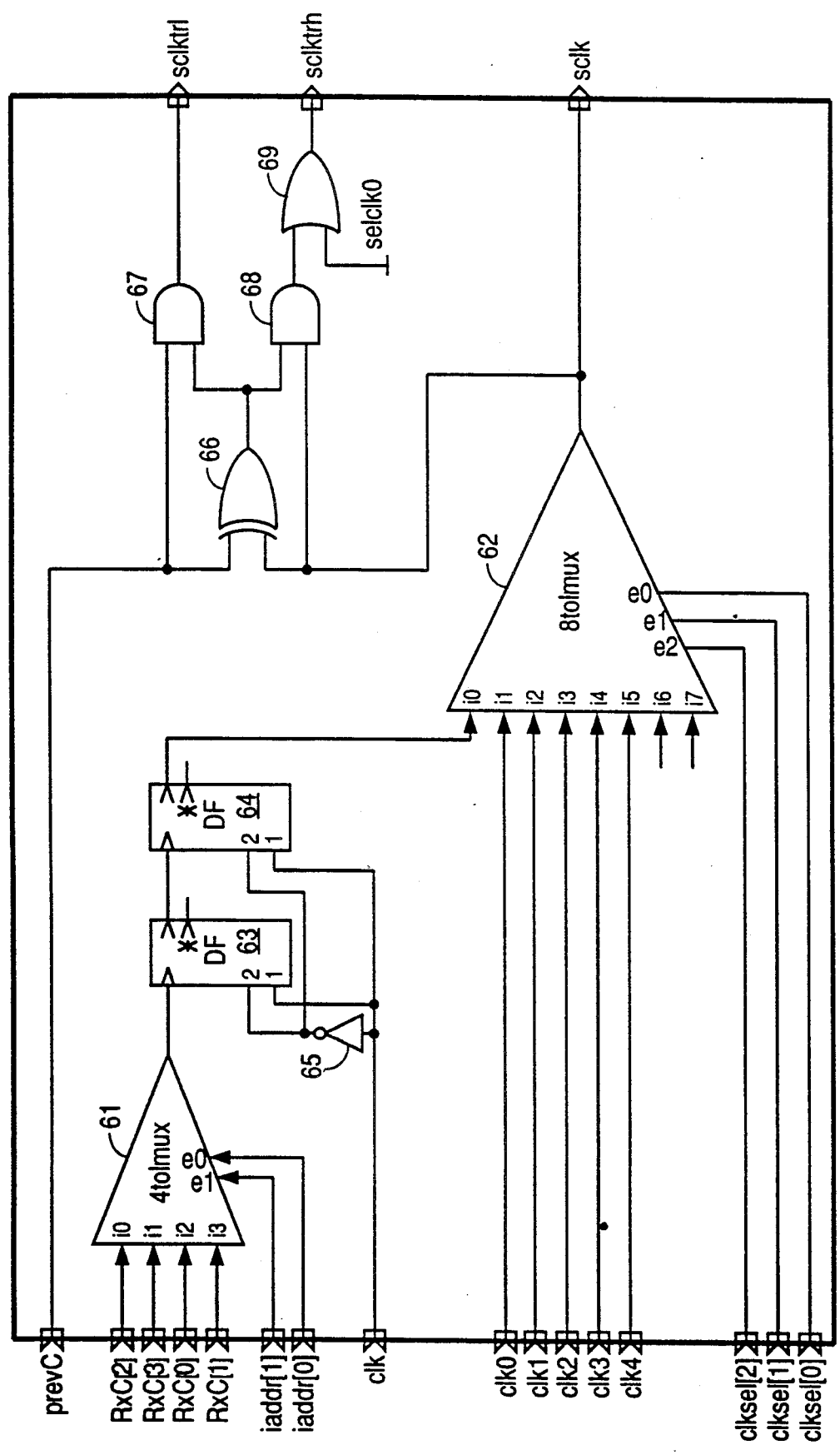

A schematic of clksync block 60 and clock option register (RCOR) block 130 is shown in FIG. 7. Clksync block 60 includes multiplexers 61 and 62, flip-flops 63 and 64 inverter 65, exclusive OR gate 66, AND gates 67 and 68 and OR gate 69. Clksync block 60 functions to eliminate metastability and to detect clock edges and level changes in the input clocks. RCOR block 130 includes multiplexer 62 to select any one of the available input clocks for use as the sampling clock. Depending upon the clock selected, the selclko signal will be either high or low.

Figure 8:
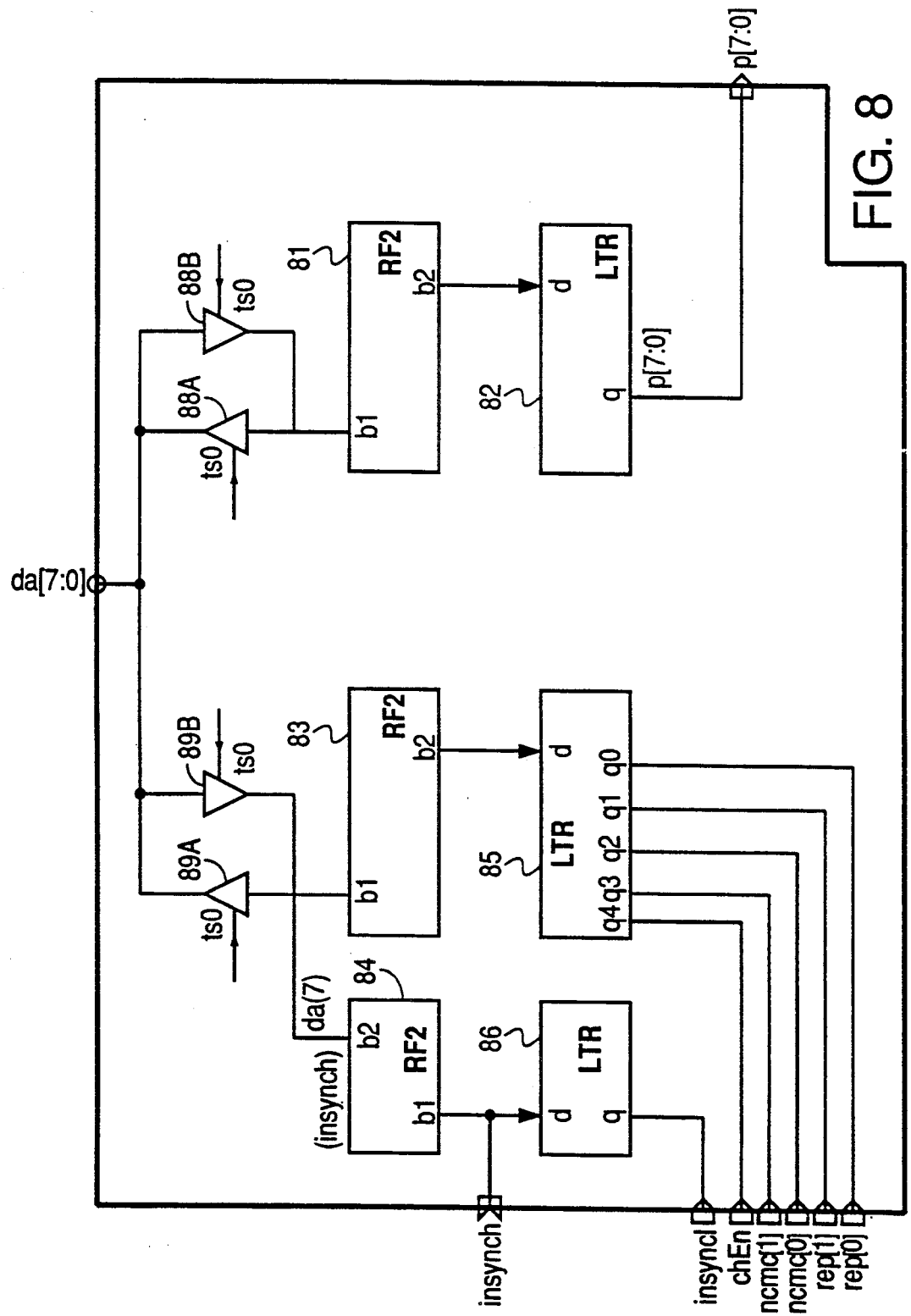

A schematic of period register block 80 is shown in FIG. 8. During operation, a user writes a value indicative of the desired period into 8-bit register 81. The value written by the user corresponds to the data rate of the incoming stream. An 8-bit latch 82 is connected to an output port of register 81. A 7-bit register 83 and a 1-bit register 84 store control bits associated with the data input circuitry. A 7-bit latch 85 and a 1-bit latch 86 are connected to registers 83 and 84, respectively. Drivers 88A and 88B are connected to register 82 and drivers 89A and 89B are connected to registers 83 and 84, respectively.

Figure 9:
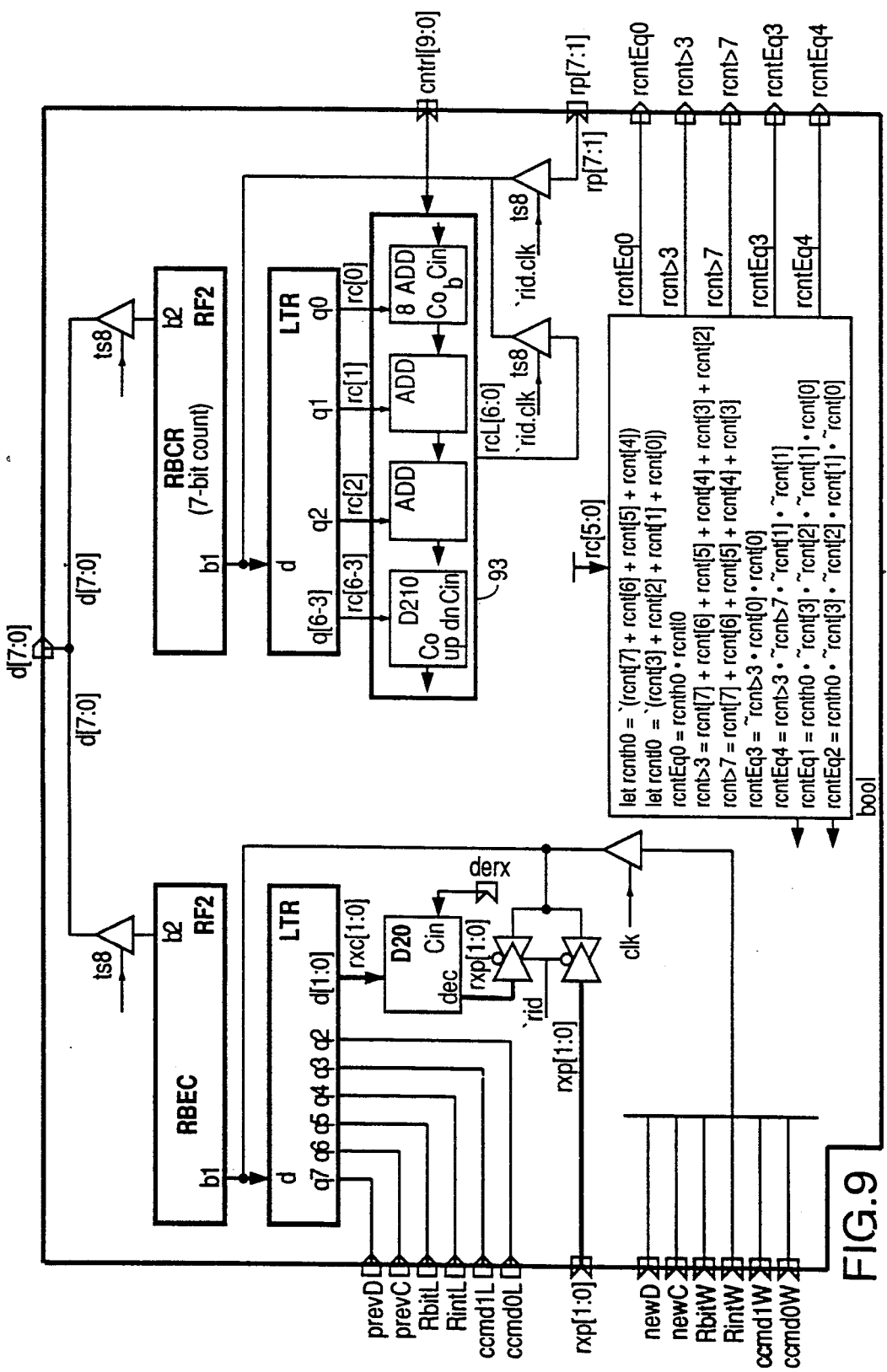

A schematic of count register block 90 is shown in FIG. 9. During operation, an 8-bit register 91 holds previous data and clock values in order to determine where transitions occur. Two bits in latch 92 are decremented every time an up/down counter 93 goes to zero. A decoder block 94 decodes the windows associated with the phase adjusting logic.

The embodiments described above are intended to be exemplary and not limiting. In view of the above disclosure, modifications will be obvious to one of ordinary skill in the art without departing from the scope of the invention.

We claim:

1. A combined BAUD rate generator and phase locked loop circuit capable of operating in either a synchronous or an asynchronous mode, the combined circuit comprising:

a single BAUD rate generator for generating a sampling signal having a selected BAUD rate, wherein said BAUD rate generator receives a clocking signal used to generator said sampling signal and wherein said clocking signal is generated by an external clock generating means;

phase adjusting means connected to said BAUD rate generator for increasing or decreasing the BAUD rate of said BAUD rate generator as a function of the phase difference between said sampling signal and a received data stream; and mode selecting means coupled to said BAUD rate generator and to said phase adjusting means for selecting either asynchronous operation or synchronous operation of said combined circuit depending upon an externally generated mode selecting signal;

wherein said phase adjusting means controls the phase of said sampling signal during the synchronous mode and wherein said phase adjusting means does not control the phase of said sampling signal during the asynchronous mode.

2. The combined BAUD rate generator and phase locked loop circuit according to claim 1 wherein said BAUD rate generator comprises a count register for sequentially storing a plurality of count values, said plurality of count values including at least a start value that is initially stored within said count register and a stop value that is stored in said count register following a predetermined period of time, wherein the BAUD rate of said sampling signal is determined as a function of the predetermined period of time.

3. The combined BAUD rate generator and phase locked loop circuit according to claim 2 wherein a first of said plurality of count values is stored in said count register after said start value is stored in said count register and before said stop value is stored in said count register, and wherein the absolute value of said first value is greater than the absolute value of said start value and greater than the absolute value of said stop value.

4. The combined BAUD rate generator and phase locked loop circuit according to claim 2 wherein said BAUD rate generator further comprises a period register coupled to said count register for storing a predetermined count select value indicative of a desired BAUD rate.

5. The combined BAUD rate generator and phase-locked loop circuit according to claim 4 further comprising means for selecting said clocking signal coupled to said count register, said means for selecting said clocking signal having an input line for receiving an externally generated clock signal.

6. The combined Baud rate generator and phase-locked loop circuit according to claim 4 wherein a first of said plurality of count values is stored in said count register after said start value is stored in said count register and before said stop value is stored in said count register, and wherein the absolute value of said first value is greater than the absolute value of said start value and greater than the absolute value of said stop value.

7. The combined BAUD rate generator and phase-locked loop circuit according to claim 2 further comprising means for selecting said clocking signal coupled to said count register, said means for selecting said clocking signal having an input line for receiving an externally generated clock signal.

8. A digital phase locked loop circuit for adjusting the phase of a sampling clock signal depending upon the phase of a received data stream comprising:

means for generating said sampling clock signal;

a counting means having an incrementing mode and a decrementing mode, said counting means both incrementing and decrementing a count value in a predetermined sequence during each cycle of the sampling clock signal; and a phase adjusting circuit connected to said counting means for changing the count value depending upon the count value at a time when a transition of the received data stream occurs.

* * * * *